(12) United States Patent
Hentschel

(10) Patent No.: US 6,226,117 B1
(45) Date of Patent: May 1, 2001

(54) NOISE FIGURE MEASUREMENT OF OPTICAL AMPLIFIERS BY POWER SUBSTITUTION

(75) Inventor: Christian Hentschel, Gaufelden (DE)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/092,419

(22) Filed: Jun. 5, 1998

(30) Foreign Application Priority Data

Jun. 26, 1997 (EP) .................................................. 97110456
Jul. 18, 1997 (EP) .................................................. 97112320

(51) Int. Cl.[7] ............................... H04B 10/08; H01S 3/08
(52) U.S. Cl. .......................... 359/337; 359/177; 359/179; 356/73.1
(58) Field of Search ..................................... 359/174, 177, 359/179, 337, 341; 356/73.1; 371/20.1

(56) References Cited

U.S. PATENT DOCUMENTS 5,095,281  * 3/1992 Tzeng ....................................... 330/2
5,340,979    8/1994 Baney et al. .
5,471,334  * 11/1995 Masuda et al. ....................... 359/177
5,521,751  *  5/1996 Aida et al. ............................ 359/337
5,561,551  * 10/1996 Iwasaki et al. ....................... 359/337
5,596,440  *  1/1997 Patz et al. ............................ 359/177
5,677,781  * 10/1997 Mori et al. ........................... 359/179
5,696,707  * 12/1997 Hentschel et al. ................... 364/574
5,781,322  *  7/1998 Uchiyama et al. ................... 359/161

FOREIGN PATENT DOCUMENTS

0678988A1   4/1994  (EP) .
0667688A1   2/1995  (EP) .
09033394    2/1997  (JP) .

OTHER PUBLICATIONS

European Search Report, 97112320.3, dtd Dec. 18, 1998.

* cited by examiner

Primary Examiner—Nelson Moskowitz

(57) ABSTRACT

Described is a noise figure measurement for optical amplifiers by disabling a signal of a channel before the measurement of the amplified spontaneous emission for that channel and by distributing a power equivalent which is substantially equal to the power of the signal of the disabled channel, at at least one other wavelength. The noise figure measurement can be used as well in multi-channel applications such as WDM, as in a single channel operation.

10 Claims, 2 Drawing Sheets

NOISE FIGURE MEASUREMENT OF OPTICAL AMPLIFIERS BY POWER SUBSTITUTION

BACKGROUND OF THE INVENTION

The present invention generally relates to noise figure measurement of optical amplifiers.

Optical amplifiers are commonly used in optical communication systems. One of the parameters that is important in characterizing an optical amplifier is the amplified spontaneous emission (ASE) in the presence of an optical signal. The measurement of ASE is important for determining a noise figure of the optical amplifier as well as for an ASE buildup in communication systems, where ASE can limit performance. The ASE represents a noise signal that is generated within the optical amplifier and is amplified by the amplifier. The ASE typically has a much wider bandwidth than the optical signal.

When no signal is present, the amplifier generates and amplifies only the ASE. However, when an optical signal is present, the ASE level is reduced in comparison with the ASE level in the absence of an optical signal due to amplifier gain reduction. The gain reduction depends on the amplitude and wavelength of the optical signal. Thus, in order to accurately characterize amplifier performance, the ASE must be measured at an optical signal level and wavelength that corresponds to normal operation.

A known technique to perform an ASE measurement at an actual signal wavelength is called time-domain extinction technique (compare e.g. U.S. Pat. No. 5,340,979). A tunable laser source is gated on and off with a fast (<1 µs) transition time. As the source signal is switched on, the optical amplifier output momentarily peaks and then returns to its steady state power level. The gated-on-time needs to be long enough such that the optical amplifier stabilizes to its steady state. Once the optical amplifier is in its steady state, the switch rapidly extinguishes the signal incident on the optical amplifier. Immediately after the signal is gated off, the ASE level at the amplifier output will be identical to the true ASE level without the deleterious effects of the stimulated and spontaneous emission generated by the laser source. Then the ASE level rises to a level that corresponds to the unsaturated state of the optical amplifier.

The ASE transient is recorded either with an optical spectrum analyzer (OSA) or, e.g., in conjunction with an oscilloscope connected to the analog output of the OSA. For the portion of the ASE transient missed after the signal was gated off, extrapolation can be used to determine the desired ASE power density. However, the time-domain extinction technique requires two highly blocking optical switches for the incident and the outgoing laser beams of the amplifier having a short switching time and switching both beams synchronously with high accuracy.

In the time-domain extinction technique, due to the relatively long carrier lifetime in the optical amplifier, the amplifier remains in essentially the same saturation condition during the short off-period. This way, the ASE can, in principle, be measured without the disturbing influence of the amplified signals and the source spontaneous emission (SSE) that accompanies them. However, there are several limitations of the time-domain extinction technique:

a) Even though the signals may be completely switched off, the photodetector does usually not fully recover from the high power state (signal) to the low power state (ASE). A noticeable error from this effect can be the result.

b) In practical implementations of the time-domain extinction technique, the sources are repetitively switched off and on with a duty cycle of 50%, thereby reducing the maximum achievable power by 50% (equivalent to 3 dB).

c) Pulsing the sources may interact with the power stabilization control loop of the amplifier.

Another possibility for ASE measurement of optical amplifiers is the ASE interpolation/subtraction technique. To explain the principle of this measurement, the typical output spectrum of an optical amplifier in a single channel condition is shown in FIG. 1. The spectrum consists of the amplified narrow-band input signal $P_{signal}$, the ASE power $P_{ASE}$ and the amplified source's spontaneous emission power $G \times P_{SSE}$, where G is the gain of the amplifier and $P_{SSE}$ is the power of the source's spontaneous emission (SSE). The latter two are spectrally wide. For such spectrally wide sources, the displayed power is equal to their spectral power density multiplied with the given spectral bandwidth of the optical spectrum analyzer.

The basis of the noise figure is the precise measurement of the spectral power density of the ASE at the signal wavelength. Practically, however, the ASE cannot be measured at the signal wavelength. Instead, the total spontaneous emission ($P_{ASE}+G \times P_{SSE}$) is interpolated from two (as in FIG. 1) or more samples to the right and the left of the signal. In the ASE interpolation/subtraction technique, G and $P_{SSE}$ are measured separately. Then the product of G and $P_{SSE}$ is subtracted from the total spontaneous emission, to obtain only $P_{ASE}$.

As a third possibility, EP 0 678 988 A1 discloses a method of measuring the ASE level in the presence of a signal at a signal wavelength comprising the steps of detuning the signal to a second wavelength different from the signal wavelength, determining a difference function corresponding to the difference in ASE levels before and after detuning of the signal as a function of wavelength, measuring the ASE level at the signal wavelength and adding the value of the difference function at the signal wavelength to the ASE level measured in the previous step.

In contrast to the single-channel excitation, FIG. 2 shows an output spectrum of an optical amplifier in a wavelength-division multiplexing (WDM) situation with four channels. In this example, the optical amplifier is driven by four narrow-band laser sources of different wavelengths. To determine the noise figure of each channel, the ASE at the signal wavelengths must be determined. This is possible by using the time-domain extinction technique or the ASE interpolation/subtraction technique. In the example of FIG. 2, each of the four ASE values is determined on the basis of interpolating the two samples to the left and the right of each channel. The gains G and the spontaneous emissions SSE of all sources are determined separately, to be able to subtract G×SSE.

If, for example, the ASE of channel 3 is to be determined, then the following procedure is typically used. All measurements are based on optical spectrum analysis.

a) Measure the SSE power of each laser at the wavelength of channel 3.
 Multiply the SSE powers with the transmissions through the respective attenuators (weighting).
 Add the weighted SSE powers, to obtain the total SSE input power of channel 3.

b) Measure the gain of channel 3 (=signal output power/signal input power).

c) Determine the total spontaneous emission, ASE+G× SSE of channel 3 by interpolation.

d) Subtract G×SSE from the total spontaneous emission, ASE+G×SSE, to obtain the ASE.

The situation becomes more complicated when the spacing between the individual channels becomes very narrow (dense WDM). In this case, it is often not possible to place samples between the channels, because of the limited resolution bandwidths of typical optical spectrum analyzer.

SUMMARY OF THE INVENTION

It is an object of the invention to provide an improved noise figure measurement of optical amplifiers.

The object is solved by the features of the independent claims.

According to an underlying principle of the invention, a noise figure measurement is based on measuring the amplified spontaneous emission (ASE) at the wavelength of a signal after disabling that signal, and substituting that signal by adding power at at least one other wavelength, in order to maintain the original saturation state of the optical amplifier.

In a preferred embodiment of the invention, power is added to other channels in use, preferably to neigboring channels, and more specifically to two neigboring channels according to the given equations (4) and (5).

The advantage of disabling and substituting a signal according to the invention is that ASE measurements can be made without the disturbing influence of that signal.

A further advantage is that, e.g. in dense wavelength-division multiplexing (WDM) situations, disabling the signal opens spectral space in which ASE measurements can be made, where otherwise this space would not be available e.g. due to a limited resolution bandwidth of an optical spectrum analyzer.

In contrast to the time-domain extinction method as known in the art, none of the signal sources, e.g. lasers, needs to be pulsed. This also removes any timing requirements during the measurement.

The measurement setup according to the invention is less expensive due to less equipment needed (e.g. no pulse generator, no fast sampling). The problem of non-ideal photodetector recovery from high power levels is avoided, thereby improving the accuracy of the ASE measurement. No interpolation of several ASE samples is necessary. The laser sources can be operated in a continuous-wave mode. This increases the available input power level to the optical amplifier.

BRIEF DESCRIPTION OF THE DRAWINGS

Other objects and many of the attendant advantages of the present invention will be readily appreciated and become better understood by reference to the following detailed description when considering in connection with the accompanied drawings, in which.

DETAILED DESCRIPTION OF THE INVENTION

The invention is based on disabling or switching off the signal of the channel under test and substituting it by adding laser power at other wavelengths, while the ASE measurement is in progress.

Figure 1:
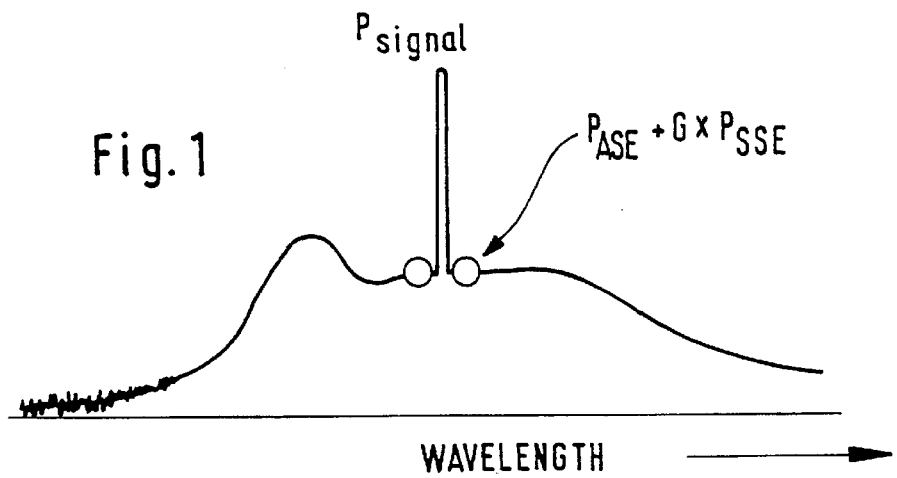
FIG. 1 shows the typical output spectrum of an optical amplifier in a single channel condition.
Figure 2:
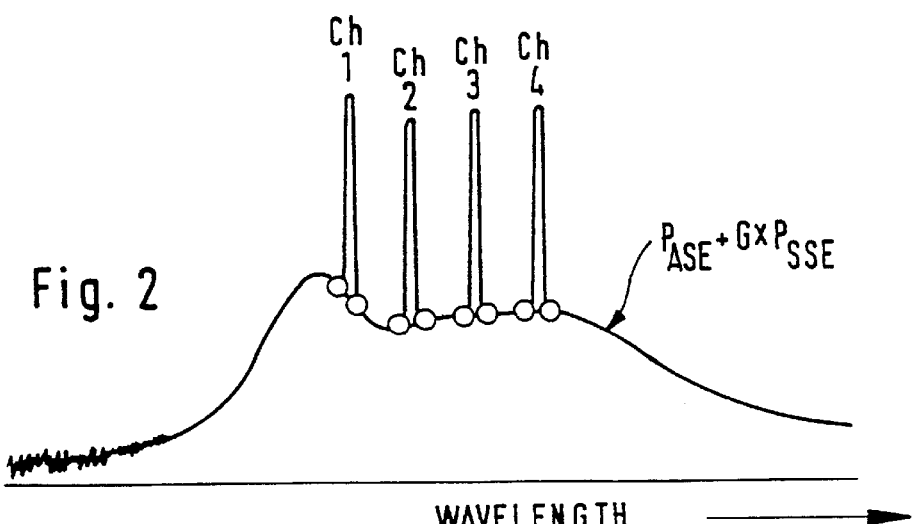
FIG. 2 shows an output spectrum of an optical amplifier in a wavelength-division multiplexing (WDM) situation with four channels.
Figure 3:
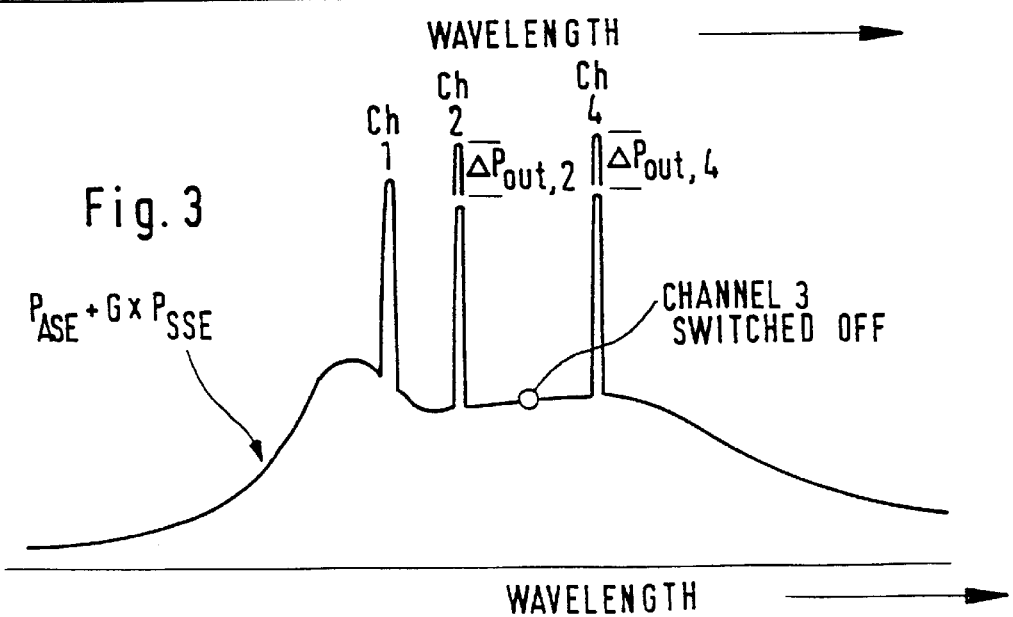
FIG. 3 shows an example of the principle of the signal substitution technique according to the invention.

FIG. 3 shows an example of the principle of the signal substitution technique according to the invention by depicting the ASE measurement of channel 3 of the four channel WDM optical amplifier of FIG. 2. However, it is to be understood that the signal substitution technique according to the invention is not limited to multi-channel applications, but can also be used in a single channel operation.

In FIG. 3, the signal power of channel 3 is switched off. This way, the channel spacing (between channels 2 and 4) is increased, which makes it possible to place samples inside the gap (which may not have been possible before due to narrow channel spacing and the limited resolution bandwidth of an optical spectrum analyzer). In FIG. 3, only one sample is shown which indicates that no interpolation is necessary.

Switching off one channel, however, generally changes the saturation state of the amplifier. To re-establish the previous saturation conditions, the power of channel 3 is substantially re-distributed, in this example by adding an input powers $\Delta P_{in,2}$ and $\Delta P_{in,4}$—as a power equivalent substantially equal to the power of channel 3 before switching off—to channels 2 and 4. After multiplication with the amplifier gain, these powers appear at the output of the amplifier as $\Delta P_{out,2}$ and $\Delta P_{out,4}$.

One possibility for determining the power equivalent and thus the new power settings is simply dividing the input power of channel 3 by 2, then adding the resulting power to both channel 2 and channel 4. However, a more sophisticated power substitution is recommended, to make sure that the amplifier is exactly in the same saturation condition. For an optical amplifier, a stable saturation condition under changing wavelength and power conditions is maintained when the following condition is met:

$$\Sigma P_{in,i} G_i = \text{const.} \tag{1}$$

where i is the current channel number, $P_{in,i}$ are the channel input powers and $G_i$ are the channel gains.

If the power of one channel is to be distributed to the two neighboring channels as in FIG. 3, then equation (1) becomes:

$$\Delta P_{in,i-1} G_{i-1} + \Delta P_{in,i+1} G_{i-1} = P_{in,i} G_i \tag{2}$$

where $\Delta P_{in,i-1}$ and $\Delta P_{in,i+1}$ are the additional channel input powers (i=3 in the example of FIG. 3).

Furthermore, it is advisable to distribute the saturation effect equally to the left and right of the channel to be substituted. This leads to the condition:

$$\Delta P_{in,i-1} G_{i-1} = \Delta P_{in,i+1} G_{i+1} \tag{3}$$

Combining equations (2) and (3) yields the additional power levels for the neighboring channels, which ensures constant saturation conditions:

$$\Delta P_{in,i-1} = \frac{P_{in,i} G_i}{2 G_{i-1}} \tag{4}$$

$$\Delta P_{in,i+1} = \frac{P_{in,i} G_i}{2 G_{i+1}} \tag{5}$$

Using equations (4) and (5), the additional input power levels can be calculated after measuring the gains of all channels before the noise figure measurement, and by using the known input power of the channel under test.

The power budget can be analyzed as follows: if, for simplicity, we assume that the additional power is equally distributed to the left and right of the channel under test, then the power of the neighboring channels must be increased to 150% of the original power during the noise figure test. Vice-versa, the achievable saturation state corresponds to ⅔ of the maximum laser power, equivalent to a loss of 1.76 dB. In comparison, the loss of the time-domain extinction method is 3 dB.

A further improvement of the power budget is possible by distributing the signal power of the channel under test to more than two neighboring channels, e.g. to 4 or 6 neighboring channels. In this case, the necessary additional power levels become even smaller.

For an improved performance in maintaining constant saturation conditions, another important requirement is that the wavelength of the substituting laser(s) is nearby the original wavelength, e.g. within 3–5 nm. Otherwise, the effect of spectral holeburning will create a different saturation condition. In the present case of dense WDM systems, the condition of nearly equal wavelengths is automatically fulfilled.

In situations where switching off one channel does not provide a sufficiently large space for placing samples between the channels, it is also possible to switch off three or more channels and add the power to the nearest remaining channels.

The ASE of the most left and most right channels can be measured with a slightly modified technique. For example, the ASE of the most right channel can be measured by displacing the wavelength of that channel by one channel spacing, and then adding the necessary power to the right and the left of the channel under test.

Figure 4:
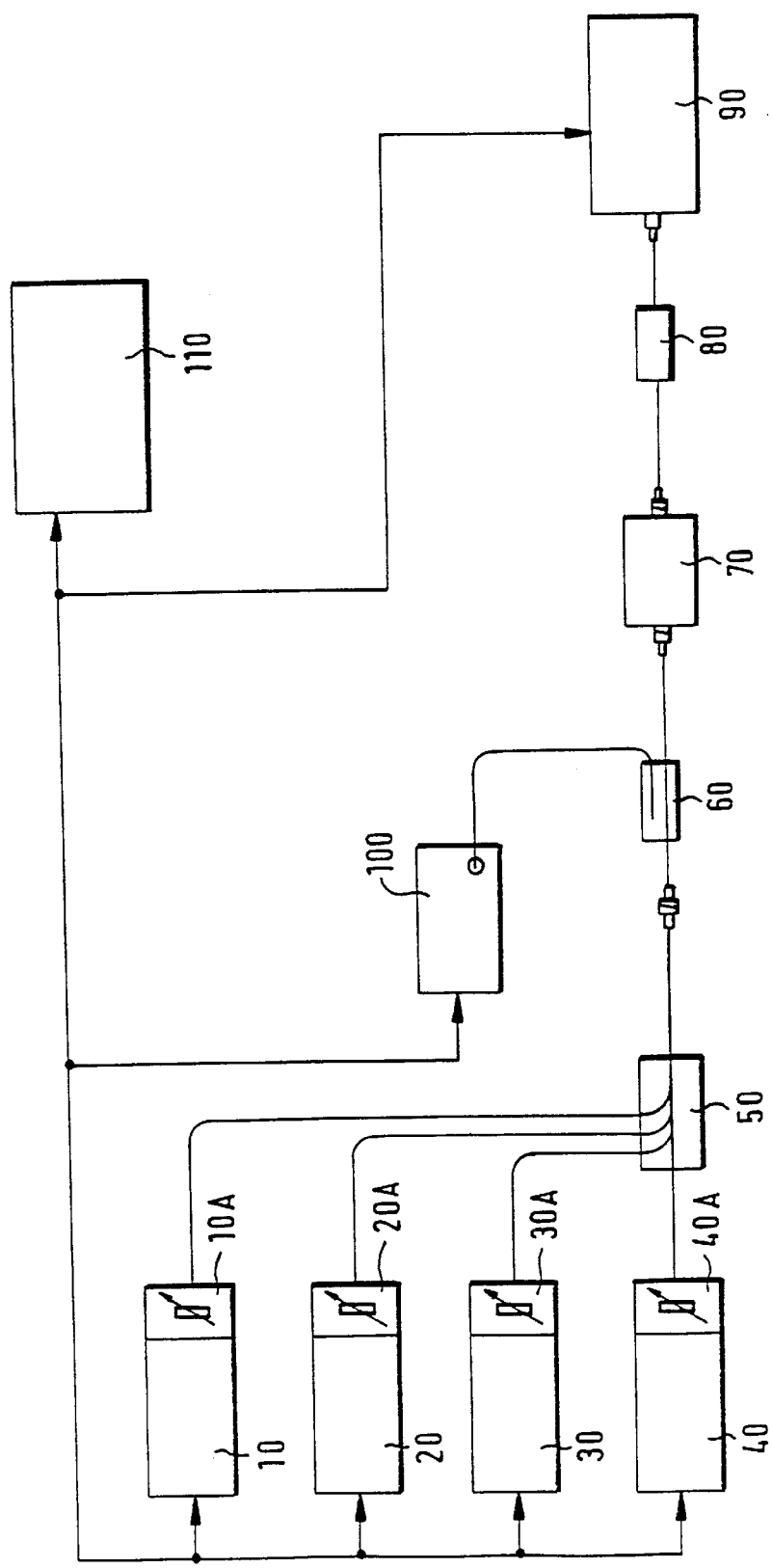
FIG. 4 shows a possible measurement setup for 4-channel gain and noise figure measurement of optical amplifiers.

A possible measurement setup for 4-channel gain and noise figure measurement of optical amplifiers is shown in FIG. 4. Four tunable lasers 10, 20, 30, 40 are used to generate the channel input powers. Each one of the lasers 10, 20, 30, 40 is equipped with an optical attenuator to control the power. Also, each one of the lasers 10, 20, 30, 40 has a separate disable function (shutter)10A, 20A, 30A, 40A. The powers from the four lasers 10, 20, 30, 40 are combined with a power combiner/coupler 50. A monitor coupler 60 and an optical power meter 100 are used to control the attenuator settings of all lasers, by separate power measurement of each laser while the remaining lasers are disabled. After an optical amplifier 70, a fixed optical attenuator 80 is used to reduce the high output power of the amplifier to an acceptable level. An optical spectrum analyzer 90 is used to measure both the signal gain(s) and the ASE. A controller 110 controls the measurement sequence.

In comparison with the time-domain extinction technique, the substitution technique has the following advantages:

a) None of the laser sources is pulsed. This also removes any timing requirements during the measurement.

b) The measurement setup is less expensive due to less equipment needed (e.g. no pulse generator, no fast sampling).

c) The problem of non-ideal recovery photodetector recovery from high power levels is avoided, thereby improving the accuracy.

d) No interpolation is necessary.

e) The laser sources are operated in continuous-wave mode. According to the analysis above, the average power to the amplifier is 1.76 dB less than the maximum laser power, compared to 3 dB less for the time-domain extinction method. A further improvement is possible by re-distributing the signal power of the channel under test to more than two neighboring channels.

It is to be understood, that the signal distribution according to the invention need not necessarily be performed in distributing power from the one or more disabled channels to other channels which are already in use for signal amplification. The power can also be distributed to one or more other wavelengths which might not be presently used e.g. for signal amplification or other purposes. Further more or in addition thereto, the power can also be distributed to one or more other sources, such as fixed or tunable laser sources, which might be provided in particular for the purpose of power distribution.

As already pointed out, the signal substitution technique according to the invention is also not limited to multi-channel applications such as WDM, but can also be used in a single channel operation. However, in case of a single channel operation, the power of the disabled channel cannot be distributed to already available other channels, but needs to be distributed to one or more other sources, such as fixed or tunable laser sources, which might be provided in particular for the purpose of power distribution.

According to an embodiment, a noise figure measurement for optical amplifiers e.g. in multichannel (WDM) operation is based on disabling the channel under test, to provide sufficient spectral space for the measurement of the total spontaneous emission.

According to another embodiment, a noise figure measurement for optical amplifiers e.g. in multichannel (WDM) operation is based on disabling additional channels, if disabling one channel does not provide sufficient spectral space for the measurement of the spontaneous emission.

According to another embodiment, a noise figure measurement for optical amplifiers e.g. in multichannel (WDM) operation is based on substituting the input power of the channel under test, by adding additional power to the right and the left of the disabled channel(s).

According to another embodiment, a noise figure measurement for optical amplifiers e.g. in multichannel (WDM) operation is based on substituting the input power of the channel under test, by adding spectrally wide power to the right and the left of the disabled channel(s), which does not have to be laser power.

According to another embodiment, a noise figure measurement for optical amplifiers e.g. in multichannel (WDM) operation is based on substituting the input power of the channel under test, by adding additional power to two or more channels to right and the left of the disabled channel (s).

According to another embodiment, a noise figure measurement for optical amplifiers e.g. in multichannel (WDM) operation is based on substituting the input power of the channel under test, by adding additional power to the two channels to right and the left of the disabled channel(s), where the additional power of the neighboring channels is given by equations (4) and (5).

According to another embodiment, a noise figure measurement for optical amplifiers e.g. in multichannel (WDM) operation is based on substituting the input power of the channel under test, by adding additional power to more than two channels to right and the left of the disabled channel(s), where the additional powers of the neighboring channels are given by appropriate extensions of equations (4) and (5).

What is claimed is:

1. A system for noise figure measurement for optical amplifiers comprising:

means for disabling a signal applied to an optical amplifier; and means for substantially substituting for the signal by adding power at at least one other signal wavelength that is applied to said amplifier.

2. The system of claim 1, wherein the means for substantially substituting for the signal comprises;

means for substituting for the input power of the disabled signal by adding additional power at at least one other wavelength.

3. The system of claim 2, wherein the means for substituting for the input power of the disabled signal is adapted to add additional power to neighboring channels of a channel of the disabled signal in a multi-channel application.

4. The system of claim 3, wherein the means for substituting for the input power of the disabled signal is adapted to add additional power to the neighboring channels of the channel of the disabled signal according to equations (4) and (5) below:

$$\Delta P_{in,i-1} = \frac{P_{in,i} G_i}{2 G_{i-1}} \quad (4)$$

$$\Delta P_{in,i+1} = \frac{P_{in,i} G_i}{2 G_{i+1}} \quad (5)$$

where: i is the current channel number, $P_{in,i}$ are the channel input powers, $G_i$ are the channel gains and $\Delta P_{in,i-1}$ and $\Delta P_{in,i+1}$ are additional channel input powers for the neighboring channels.

5. The system of claim 1, wherein the means for substantially substituting for the signal adds power, which is substantially equal to the power of the disabled signal, at at least one other wavelength.

6. A method for noise figure measurement for optical amplifiers comprising the steps of:

disabling a signal to an optical amplifier, and substantially substituting for the signal, by adding power at at least one other wavelength that is applied to said optical amplifier.

7. The method of claim 6, wherein the step of substantially substituting the signal comprises the step of:

substituting for the input power of the disabled signal by adding additional power at at least one other wavelength.

8. The method of claim 7, wherein the step of substituting the input power for the disabled signal comprises a step of:

adding additional power to neighboring channels of a channel including the disabled signal.

9. The method of claim 8, wherein the step of substituting the input power of the disabled signal comprises a step of:

adding additional power to neighboring channels of the channel of the disabled signal according to equations (4) and (5) below:

$$\Delta P_{in,i-1} = \frac{P_{in,i} G_i}{2 G_{i-1}} \quad (4)$$

$$\Delta P_{in,i+1} = \frac{P_{in,i} G_i}{2 G_{i+1}} \quad (5)$$

where: i is the current channel number, $P_{in,i}$ are the channel input powers, $G_i$ are the channel gains and $\Delta P_{in,i-1}$ and $\Delta P_{in,i+1}$ are additional channel input powers for the neighboring channels.

10. A method for noise figure measurement for optical amplifiers comprising the steps of:

disabling a signal applied to an optical amplifier, and substituting for said disabled signal by applying a power equivalent, which is substantially equal to the power of the disabled signal, at at least one other wavelength.

* * * * *